(12) United States Patent
Roberts et al.

(10) Patent No.: US 10,821,696 B2
(45) Date of Patent: Nov. 3, 2020

(54) METHODS FOR MANUFACTURING FLATBACK AIRFOILS FOR WIND TURBINE ROTOR BLADES

(71) Applicant: General Electric Company, Schenectady, NY (US)

(72) Inventors: David Roberts, Amsterdam (NL); Nicholas K. Althoff, La Crosse, WI (US); Michael Wenani Nielsen, Bjert (DK); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 15/935,288

(22) Filed: Mar. 26, 2018

(65) Prior Publication Data

US 2019/0291365 A1    Sep. 26, 2019

(51) Int. Cl.
    *F03D 1/06*       (2006.01)
    *B29D 99/00*      (2010.01)
    (Continued)

(52) U.S. Cl.
    CPC .......... *B29D 99/0028* (2013.01); *B29C 70/30* (2013.01); *B29C 70/682* (2013.01); *B29C 70/70* (2013.01); *B29C 70/763* (2013.01); *B29C 70/86* (2013.01); *B33Y 80/00* (2014.12); *F03D 1/0633* (2013.01); *F03D 1/0641* (2013.01); *F03D 1/0675* (2013.01); *F03D 1/0683* (2013.01); *B29K 2101/12* (2013.01); *B29K 2105/0872* (2013.01); *B29L 2031/082* (2013.01); *F05B 2230/50* (2013.01); *F05B 2240/2211* (2013.01); *F05B 2240/30* (2013.01)

(58) Field of Classification Search
    None
    See application file for complete search history.

(56) References Cited

U.S. PATENT DOCUMENTS

| RE19,412 E  | 1/1935  | Zaparka |
| 2,450,440 A | 10/1948 | Mills   |

(Continued)

FOREIGN PATENT DOCUMENTS

| CN | 101906251 A | 12/2010 |
| CN | 103358564 A | 10/2013 |

(Continued)

OTHER PUBLICATIONS

U.S. Appl. No. 15/424,055, filed Feb. 3, 2017.

(Continued)

*Primary Examiner* — Michael Lebentritt
(74) *Attorney, Agent, or Firm* — Dority & Manning, P.A.

(57) ABSTRACT

Methods for manufacturing a wind turbine rotor blade having a flatback airfoil configuration along at least a portion of a span of the rotor blade include providing a shell mold of the rotor blade. The method also includes laying up an outer skin layer of the rotor blade into the shell mold. Further, the method includes placing at least one pre-fabricated corner of the flatback airfoil configuration into the shell mold. The pre-fabricated corner(s) has a pointed edge. The method also includes infusing the outer skin layer with the pre-fabricated corner(s) to form the flatback airfoil configuration.

20 Claims, 6 Drawing Sheets

(51) Int. Cl.
*B33Y 80/00* (2015.01)
*B29C 70/30* (2006.01)
*B29C 70/68* (2006.01)
*B29C 70/70* (2006.01)
*B29C 70/76* (2006.01)
*B29C 70/86* (2006.01)
*B29K 101/12* (2006.01)
*B29K 105/08* (2006.01)
*B29L 31/08* (2006.01)

(56) References Cited

U.S. PATENT DOCUMENTS

| | | |
|---|---|---|
| 2,451,131 A | 10/1948 | Vidal |
| 2,503,450 A | 4/1950 | Nebesar |
| 3,000,446 A | 9/1961 | Warnken |
| 3,137,887 A | 6/1964 | Mannino et al. |
| 3,528,753 A | 9/1970 | Dutton et al. |
| 3,586,460 A | 6/1971 | Toner |
| 3,956,564 A | 5/1976 | Hillig |
| 4,319,872 A | 3/1982 | Lupke |
| 4,329,119 A | 5/1982 | Baskin |
| 4,474,536 A | 10/1984 | Gougeon et al. |
| 4,626,172 A | 12/1986 | Mouille et al. |
| 4,718,844 A | 1/1988 | Dickhut |
| 5,059,109 A | 10/1991 | Dickhut |
| 5,088,665 A | 2/1992 | Vijgen et al. |
| 5,346,367 A | 9/1994 | Doolin et al. |
| 6,264,877 B1 | 7/2001 | Pallu De La Barriere |
| 6,890,152 B1 | 5/2005 | Thisted |
| 7,059,833 B2 | 6/2006 | Stiesdal et al. |
| 7,364,407 B2 | 4/2008 | Grabau |
| 7,458,777 B2 | 12/2008 | Herr |
| 7,637,721 B2 | 12/2009 | Driver et al. |
| 7,976,275 B2 | 7/2011 | Miebach et al. |
| 7,988,421 B2 | 8/2011 | Bakhuis et al. |
| 8,007,624 B2 | 8/2011 | Stiesdal |
| 8,062,728 B2 | 11/2011 | De Beats |
| 8,083,488 B2 | 12/2011 | Fritz |
| 8,092,187 B2 | 1/2012 | Bell et al. |
| 8,162,590 B2 | 4/2012 | Haag |
| 8,273,806 B2 | 9/2012 | Guadagno et al. |
| 8,317,479 B2 | 11/2012 | Vronsky et al. |
| 8,376,450 B1 | 2/2013 | Long et al. |
| 8,540,491 B2 | 9/2013 | Gruhn |
| 8,602,761 B2 | 12/2013 | Arrizabalaga |
| 8,657,581 B2 | 2/2014 | Pilpel et al. |
| 8,673,106 B1 | 3/2014 | Jolley et al. |
| 8,678,746 B2 | 3/2014 | Haag |
| 8,708,691 B2 | 4/2014 | Matsen et al. |
| 8,747,098 B1 | 6/2014 | Johnson et al. |
| 8,865,798 B2 | 10/2014 | Merle et al. |
| 8,877,116 B2 | 11/2014 | Grabau |
| 8,932,024 B2 | 1/2015 | Hayashi et al. |
| 8,961,142 B2 | 2/2015 | Wansink |
| 8,992,813 B2 | 3/2015 | Robbins et al. |
| 9,090,027 B2 | 7/2015 | Sutton |
| 9,150,721 B2 | 10/2015 | Bateman et al. |
| 9,377,005 B2 | 6/2016 | Yarbrough et al. |
| 9,434,142 B2 | 9/2016 | Levit |
| 9,458,821 B2 | 10/2016 | Jacobsen et al. |
| 9,512,818 B2 | 12/2016 | Richtman |
| 9,719,489 B2 | 8/2017 | Stewart |
| 10,273,935 B2 | 4/2019 | Albert |
| 2007/0065290 A1 | 3/2007 | Herr |
| 2007/0077150 A1 | 4/2007 | Llorente Gonzalez |
| 2007/0107189 A1 | 5/2007 | Prichard |
| 2009/0068017 A1 | 3/2009 | Rudling |
| 2009/0074585 A1 | 3/2009 | Koegler et al. |
| 2009/0140527 A1 | 6/2009 | Pawar |
| 2009/0148300 A1 | 6/2009 | Driver et al. |
| 2009/0155084 A1 | 6/2009 | Livingston et al. |
| 2009/0301648 A1 | 12/2009 | Hogg |
| 2010/0047070 A1 | 2/2010 | Slot |
| 2010/0121475 A1 | 5/2010 | Lyons |
| 2010/0135806 A1 | 6/2010 | Benito |
| 2010/0296940 A1 | 11/2010 | Zuteck |
| 2010/0296941 A1 | 11/2010 | Zuteck |
| 2011/0018282 A1 | 1/2011 | Hayashi et al. |
| 2011/0076149 A1 | 3/2011 | Santiago et al. |
| 2011/0097211 A1 | 4/2011 | Rudling |
| 2011/0097326 A1 | 4/2011 | Luehrsen |
| 2011/0100540 A1 | 5/2011 | Matthew |
| 2011/0135467 A1 | 6/2011 | Saddoughi et al. |
| 2011/0142635 A1 | 6/2011 | Frizt |
| 2011/0142667 A1 | 6/2011 | Miebach et al. |
| 2011/0142668 A1 | 6/2011 | Rao |
| 2011/0142670 A1 | 6/2011 | Pilpel |
| 2011/0176928 A1 | 7/2011 | Jense |
| 2011/0200444 A1 | 8/2011 | Garcia |
| 2011/0223028 A1 | 9/2011 | Stege et al. |
| 2011/0243736 A1 | 10/2011 | Bell |
| 2011/0243750 A1 | 10/2011 | Gruhn |
| 2011/0266721 A1 | 11/2011 | Song et al. |
| 2011/0268558 A1 | 11/2011 | Driver |
| 2011/0286853 A1* | 11/2011 | Kristensen ............ B32B 1/00 416/229 R |
| 2012/0009069 A1 | 1/2012 | Grove-Nielsen |
| 2012/0027590 A1 | 2/2012 | Bonnet |
| 2012/0027610 A1 | 2/2012 | Yarbrough |
| 2012/0027612 A1 | 2/2012 | Yarbrough |
| 2012/0027613 A1 | 2/2012 | Yarbrough |
| 2012/0121430 A1 | 5/2012 | Olsen et al. |
| 2012/0128810 A1 | 5/2012 | Arriola Arizabalaga et al. |
| 2012/0134848 A1 | 5/2012 | Ramirez Jimenez et al. |
| 2012/0138218 A1 | 6/2012 | Dean et al. |
| 2012/0183408 A1 | 7/2012 | Noerlem |
| 2012/0186730 A1 | 7/2012 | Sindo |
| 2012/0263913 A1 | 10/2012 | Karem |
| 2013/0108455 A1 | 5/2013 | Quiring et al. |
| 2013/0164133 A1 | 6/2013 | Grove-Nielsen |
| 2013/0186558 A1 | 7/2013 | Comb |
| 2013/0241117 A1 | 9/2013 | Lind |
| 2014/0072715 A1 | 3/2014 | Jones et al. |
| 2014/0178204 A1 | 6/2014 | Livingston et al. |
| 2014/0186175 A1 | 7/2014 | Baehmann et al. |
| 2014/0205454 A1 | 7/2014 | Giovannetti et al. |
| 2014/0295187 A1 | 10/2014 | Jacobsen |
| 2014/0322023 A1 | 10/2014 | Tapia |
| 2014/0328692 A1 | 11/2014 | Riddell et al. |
| 2014/0334930 A1 | 11/2014 | Rob |
| 2015/0224759 A1 | 8/2015 | Boon |
| 2015/0247487 A1 | 9/2015 | Oerlemans et al. |
| 2015/0298403 A1 | 10/2015 | Hedges et al. |
| 2015/0308404 A1 | 10/2015 | Dahl |
| 2015/0316028 A1 | 11/2015 | Breckenfeld |
| 2015/0322920 A1 | 11/2015 | Jones |
| 2016/0023433 A1 | 1/2016 | Langone |
| 2016/0107397 A1 | 4/2016 | Schibsbye |
| 2016/0146019 A1 | 5/2016 | Pizano et al. |
| 2016/0168997 A1 | 6/2016 | Garm |
| 2016/0263844 A1 | 9/2016 | Smith |
| 2016/0297145 A1 | 10/2016 | Wu |
| 2016/0319801 A1 | 11/2016 | Smith |
| 2016/0327019 A1 | 11/2016 | Tobin et al. |
| 2016/0327020 A1 | 11/2016 | Tobin et al. |
| 2016/0327021 A1 | 11/2016 | Tobin et al. |
| 2016/0354984 A1 | 12/2016 | Hedges |
| 2016/0377050 A1 | 12/2016 | Caruso et al. |
| 2016/0377051 A1 | 12/2016 | Caruso et al. |
| 2016/0377052 A1 | 12/2016 | Caruso et al. |
| 2017/0015066 A1 | 1/2017 | Herrmann |
| 2017/0021575 A1 | 1/2017 | Hansen et al. |
| 2017/0022821 A1* | 1/2017 | Ferber .................... F01D 5/025 |
| 2017/0030330 A1 | 2/2017 | Caruso |
| 2017/0050372 A1 | 2/2017 | Nielsen et al. |
| 2017/0051718 A1 | 2/2017 | Klitgaard |
| 2017/0057158 A1 | 3/2017 | Caruso et al. |
| 2017/0058862 A1 | 3/2017 | Caruso et al. |
| 2017/0058865 A1 | 3/2017 | Caruso et al. |
| 2017/0058866 A1 | 3/2017 | Caruso |
| 2017/0074236 A1 | 3/2017 | Hynum et al. |
| 2017/0074237 A1 | 3/2017 | Caruso et al. |
| 2017/0074238 A1 | 3/2017 | Tobin et al. |

(56) References Cited

U.S. PATENT DOCUMENTS

| | | |
|---|---|---|
| 2017/0074240 A1 | 3/2017 | Caruso et al. |
| 2017/0082087 A1 | 3/2017 | Yarbrough |
| 2017/0082088 A1 | 3/2017 | Yarbrough et al. |
| 2017/0100902 A1 | 4/2017 | Asmatulu et al. |
| 2017/0113265 A1 | 4/2017 | Slavens et al. |
| 2017/0122287 A1 | 5/2017 | Dobbe et al. |
| 2017/0145990 A1 | 5/2017 | Drack et al. |
| 2017/0175534 A1* | 6/2017 | Ferber ............... F01D 5/147 |
| 2017/0204833 A1 | 7/2017 | Albert et al. |
| 2017/0252966 A1 | 9/2017 | Susnjara |
| 2017/0306766 A1 | 10/2017 | Munzer |
| 2018/0135602 A1 | 5/2018 | Tobin et al. |
| 2018/0156190 A1* | 6/2018 | Johnson ............ F03D 1/0675 |
| 2018/0216601 A1 | 8/2018 | Yarbrough |
| 2018/0229452 A1 | 8/2018 | Ogale |
| 2018/0264749 A1* | 9/2018 | Albert ................ B33Y 10/00 |
| 2018/0283349 A1 | 10/2018 | Wardropper |
| 2018/0311927 A1 | 11/2018 | Tyan |
| 2019/0001589 A1 | 1/2019 | Salimi |
| 2019/0032491 A1 | 1/2019 | Nissen et al. |
| 2019/0153994 A1* | 5/2019 | Tobin ................. B29C 64/393 |
| 2019/0178227 A1 | 6/2019 | Hawkins |
| 2019/0195191 A1* | 6/2019 | Girolamo ........... F03D 1/0675 |
| 2019/0293049 A1* | 9/2019 | Roberts .............. F03D 1/0675 |

FOREIGN PATENT DOCUMENTS

| | | |
|---|---|---|
| CN | 204488065 U | 7/2015 |
| CN | 104955278 A | 9/2015 |
| CN | 107187020 A | 9/2018 |
| EP | 0435466 A2 | 7/1991 |
| EP | 2 204 577 A2 | 7/2010 |
| EP | 2653717 A1 | 10/2013 |
| EP | 3037655 A1 | 6/2016 |
| EP | 3 138 697 A1 | 8/2017 |
| ES | 237 1893 | 11/2012 |
| JP | H07102609 B2 | 11/1995 |
| JP | 2000 317972 A | 11/2000 |
| JP | 2007/009926 A | 1/2007 |
| JP | 2007/092716 A | 4/2007 |
| JP | 2012 158151 A | 8/2012 |
| KR | 101 520 898 B1 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO2015/015202 A1 | 2/2015 |
| WO | WO2017/092766 A1 | 6/2017 |
| WO | WO 2018/015250 A1 | 1/2018 |

OTHER PUBLICATIONS

U.S. Appl. No. 15/424,084, filed Feb. 3, 2017.

PCT Search Report, dated Jun. 25, 2019.

CGTech Vericut, Automated Fibre Placement—wind blade: Vericut Composite CNC simulation, Sep. 16, 2015, YouTube, retrieved from the Internet on Sep. 28, 2019, URL: https://youtu.be/xFNtTE82DiU (Year: 2015).

Thamizhisai Periyaswamy, Karthikeyan Balasubramanian, Christopher Pastore, "Novel characterization method for fibrous materials using non-contact acoustics: Material properties revealed by ultrasonic perturbations", Sep. 16, 2014, Elsevier, Ultrasonics 56, 261-369 (Year: 2014).

Zhai, Yuwei et. al., Additive Manufacturing: Making Imagination the Major Limitation, Journal of Metals, vol. 66, No. 5, Springer, NY, Mar. 11, 2014 pp. 808-816.

Patlolla, New progress in self-healing technology of composite wind turbine blades, Department of Mechanical Engineering, Wichita State Univeristy, http://soar.wichita.edu/handle/10057/5493, Feb. 16, 2012, (Abstract Only).

Matt, Development of Novel Self-Healing Polymer Composites for Use in Wind Turbine Blades http://energyresources.asmedigitalcollection.asme.org/article.aspx?articleid=2174064, The American Society of Mechanical Engineers, Journal of Energy Resources Technology, vol. 137, Issue 5, Sep. 1, 2015 (Abstract Only).

Teuwen et al., Vacuum Infused Thermoplastic Composites for Wind Turbine Blades, 2008 Wind Turbine Blade Workshop—Sandia National Laboratories, Jun. 3, 2008, 22 pages.

* cited by examiner

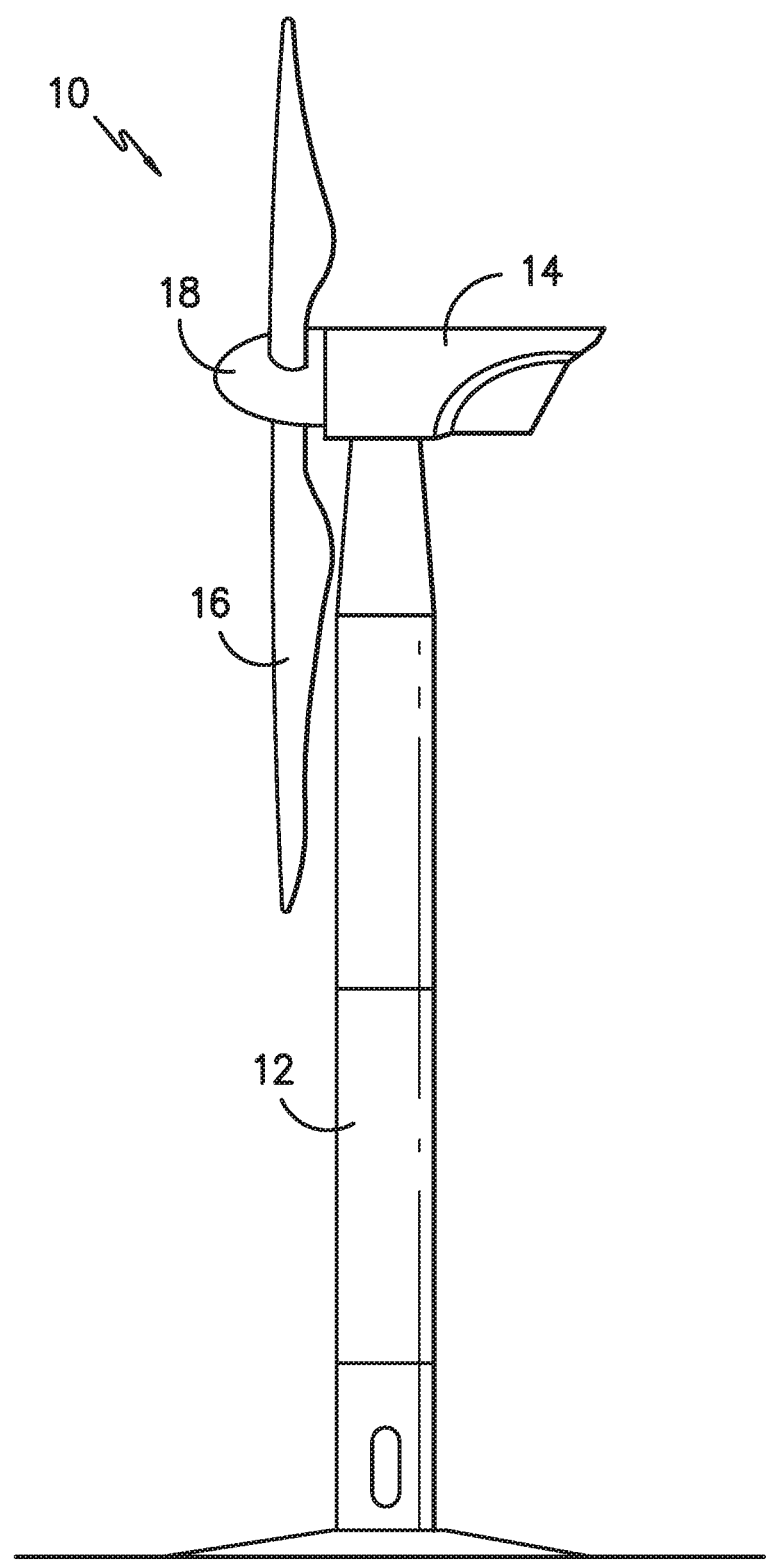
FIG. -1-

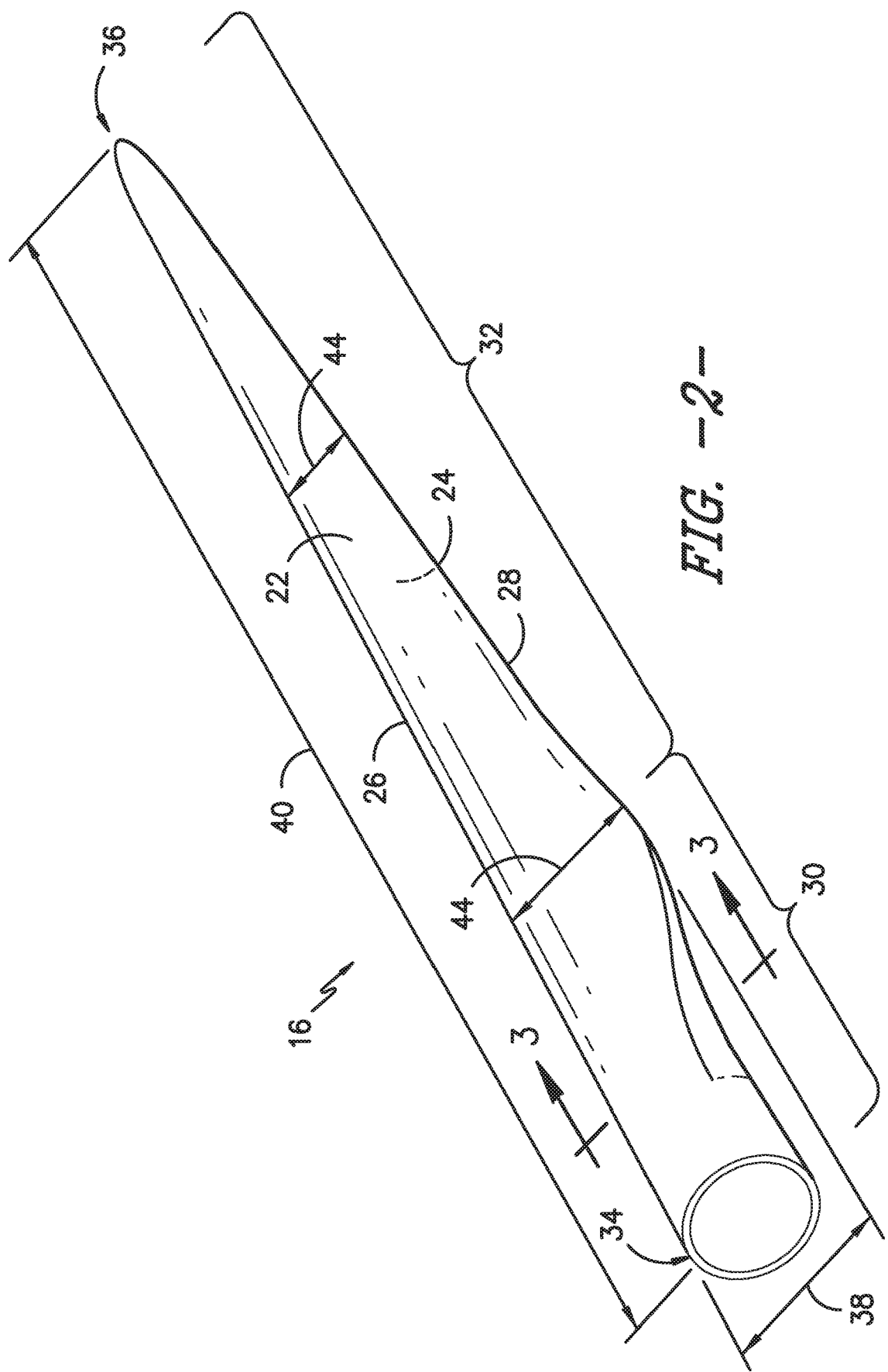
FIG. -2-

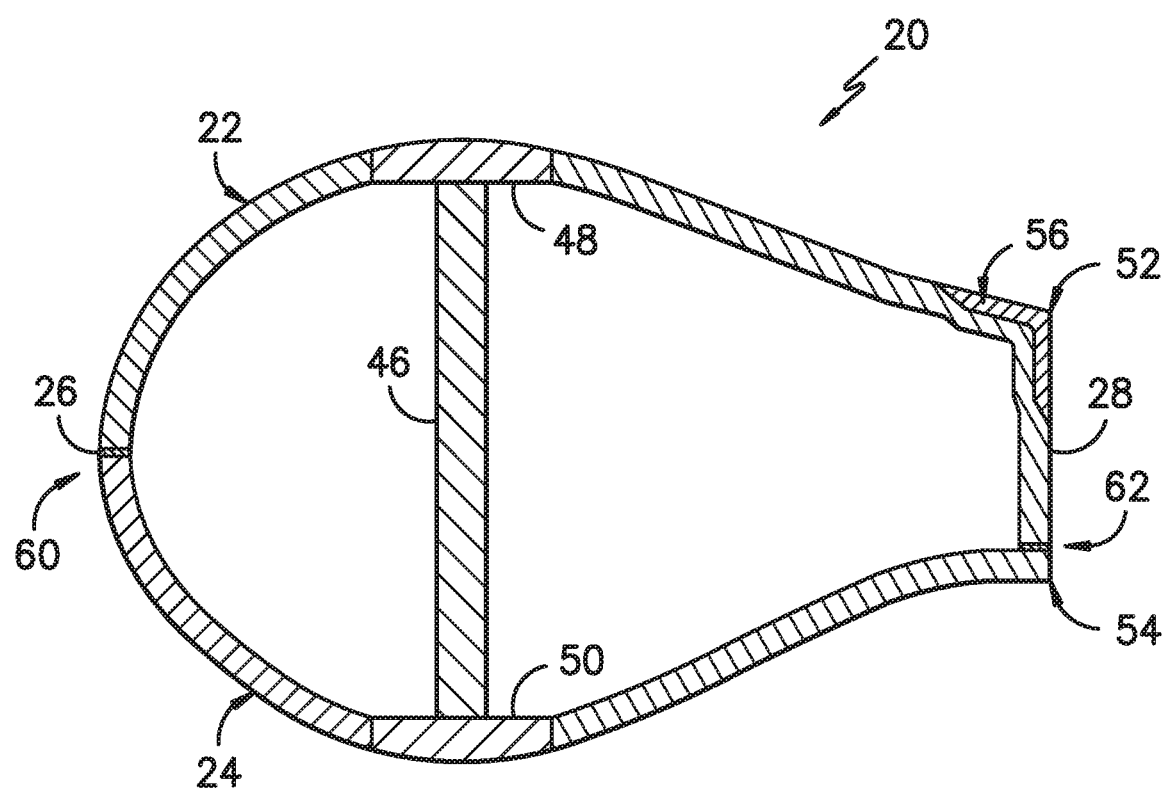
FIG. -3-

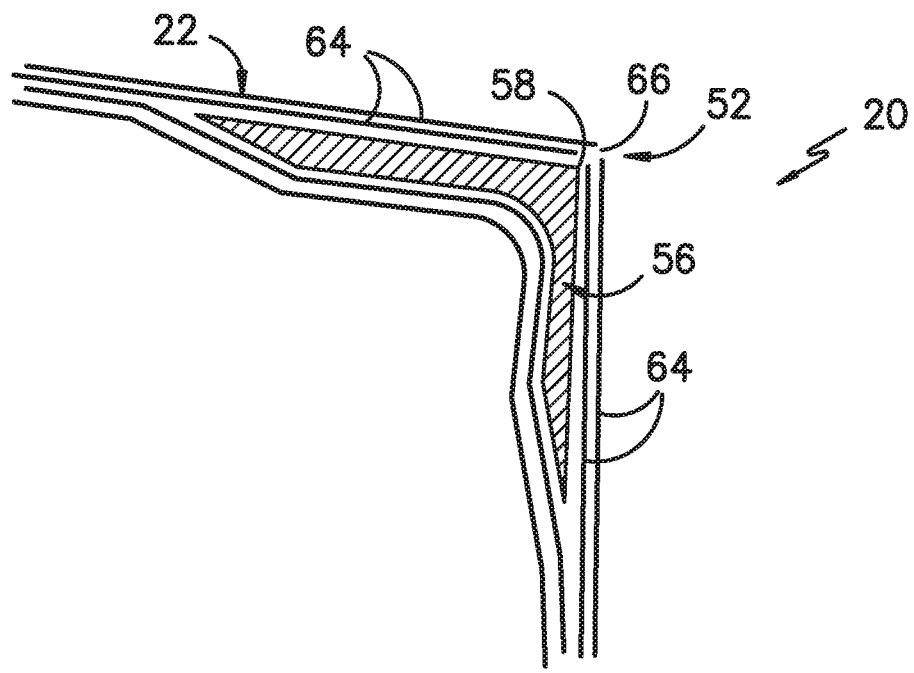
FIG. -4-
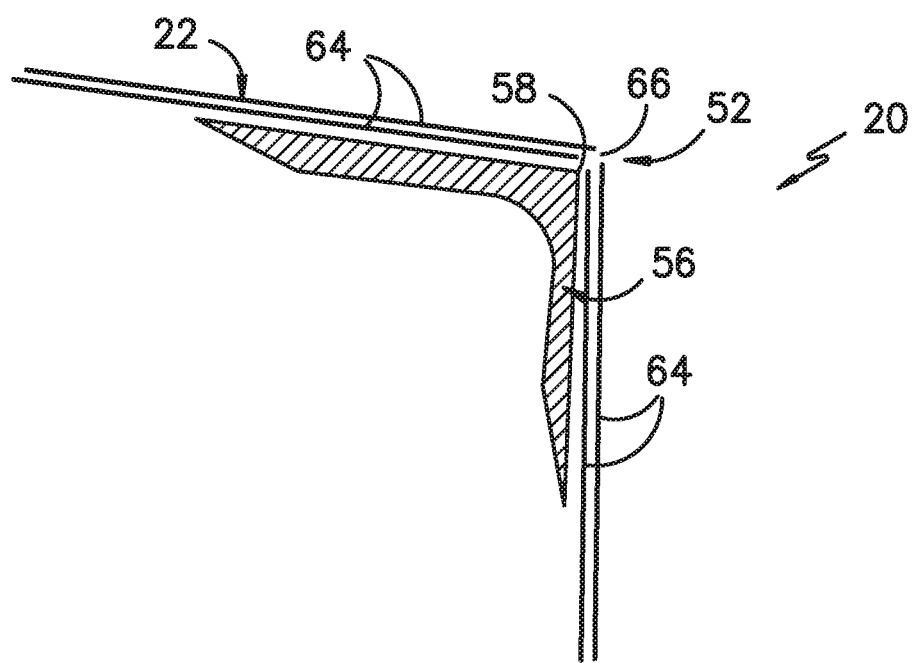
FIG. -5-

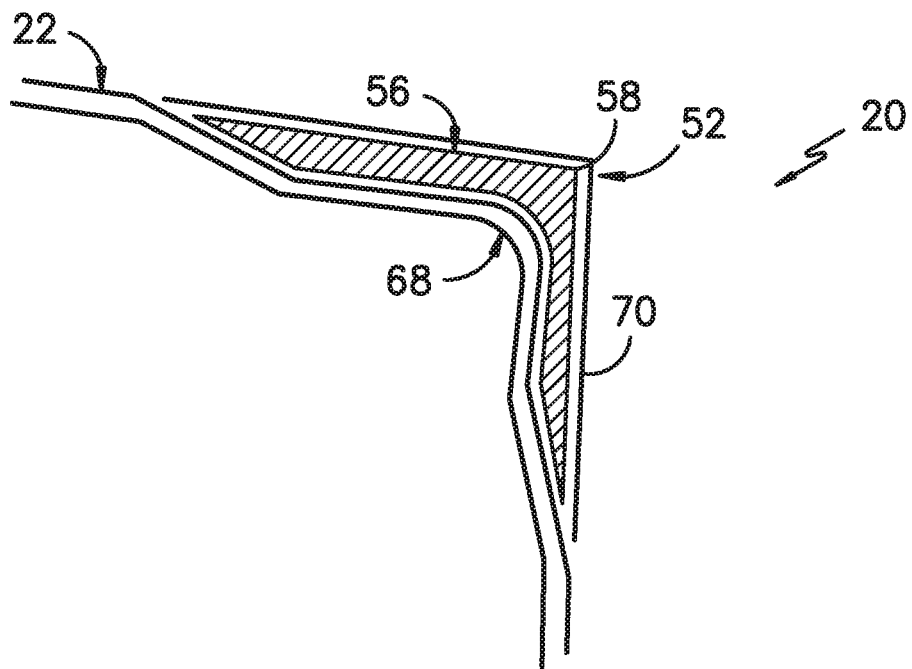
FIG. -6-
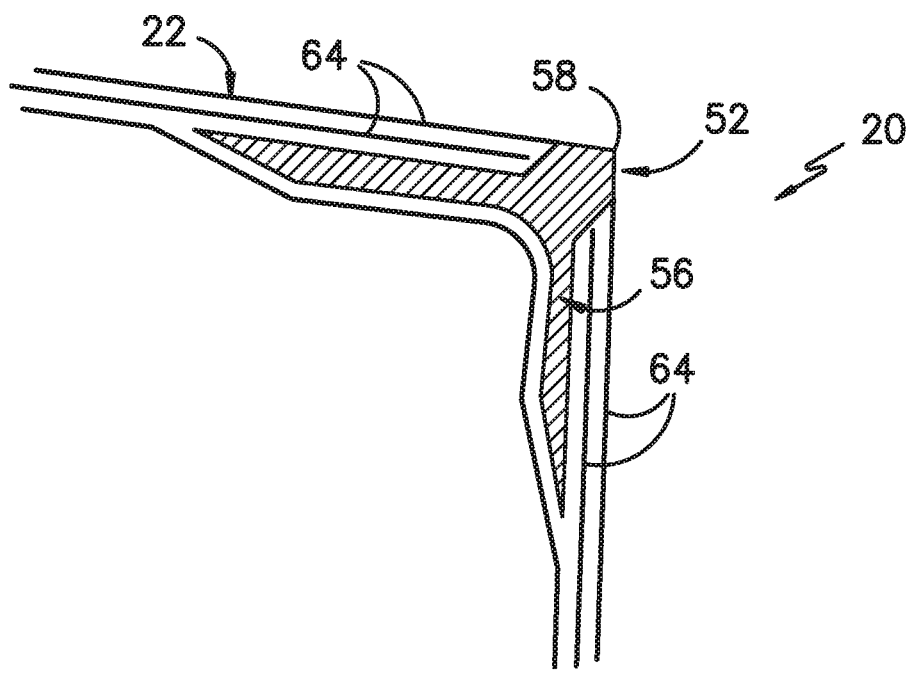
FIG. -7-

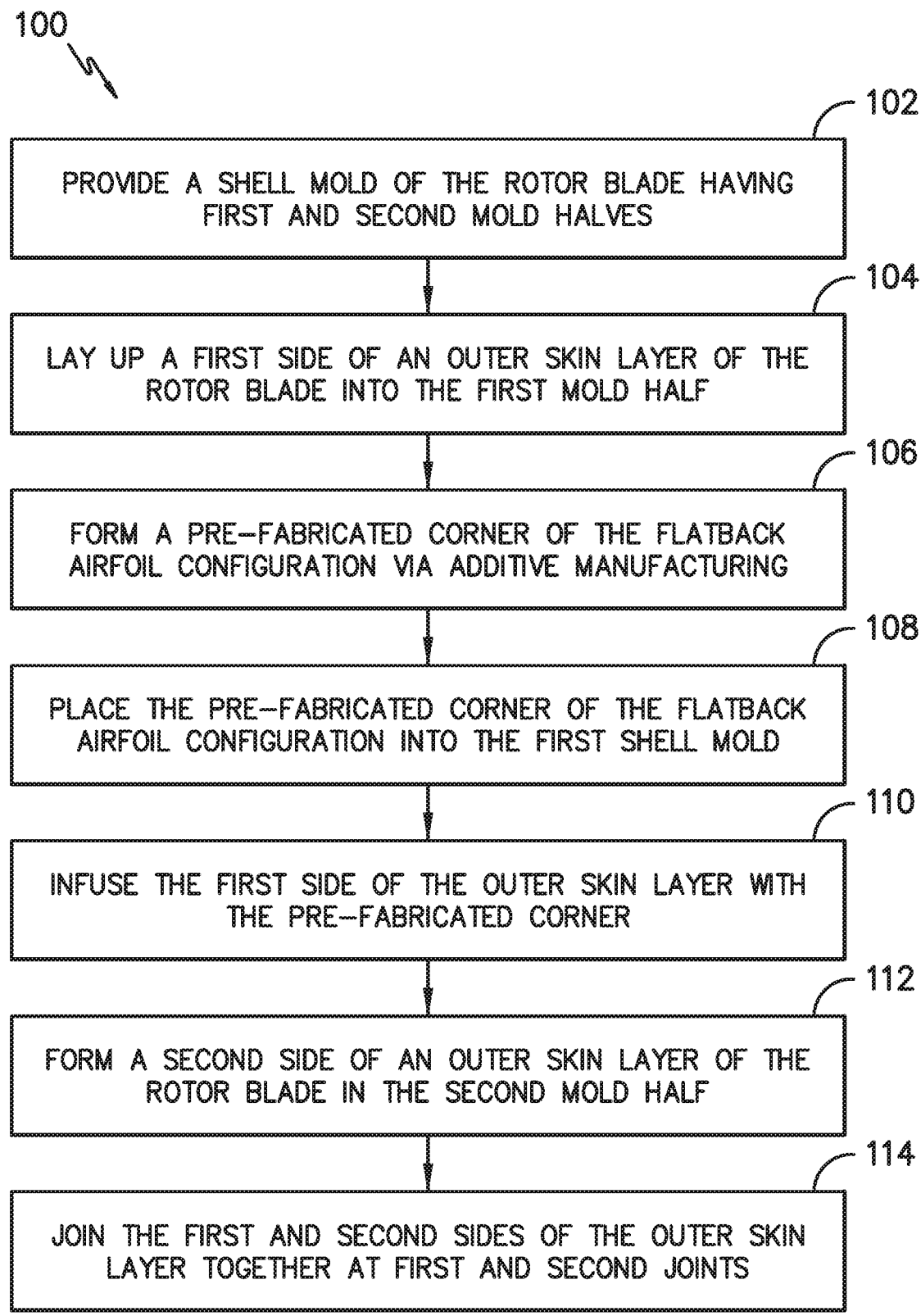
FIG. -8-

METHODS FOR MANUFACTURING FLATBACK AIRFOILS FOR WIND TURBINE ROTOR BLADES

FIELD

The present disclosure relates in general to wind turbine rotor blades, and more particularly to methods for manufacturing flatback airfoils for wind turbine rotor blades.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Each rotor blade extends from the hub at a root of the blade and continues to a tip. A cross-section of the blade is defined as an airfoil. The shape of an airfoil may be defined in relationship to a chord line. The chord line is a measure or line connecting the leading edge of the airfoil with the trailing edge of the airfoil. The shape may be defined in the form of X and Y coordinates from the chord line. The X and Y coordinates generally are dimensionless. Likewise, the thickness of an airfoil refers to the distance between the upper surface and the lower surface of the airfoil and is expressed as a fraction of the chord length.

The inboard region, i.e., the area closest to the hub, generally requires the use of relatively thick foils ($30\% \leq t/c \leq 40\%$). The aerodynamic performance of conventional airfoil designs, however, degrades rapidly for thicknesses greater than 30% of chord largely due to flow separation concerns. For thicknesses above 40% of chord, massive flow separation may be unavoidable such that the region of the blade may be aerodynamically compromised.

In some instances, flatback airfoils and/or airfoils having truncated trailing edges may be used in the inboard region to allow for higher lift of thick airfoils but at reduced chords. Traditional flatback designs, however, can be extremely costly and complicated to manufacture as the aerodynamics of the flatback airfoil requires pointed corners around the upwind and downwind corners. Conventional flatback airfoils are manufactured using a balsa core design around the downwind corner as well as additional post molding using fillers, which proves to be very difficult and time consuming to create and causes defects in production. In addition, the balsa core transition from the flatback to the normal core is very difficult to design and also creates defects in production. Thus, it is difficult or even impossible to create two pointed corners using conventional manufacturing methods. Rather, only one shell edge is capable of being pointed, which is usually the upwind corner that utilizes a glue joint. In addition, the flatback downwind corner typically has high prying moments.

Thus, there is a need for new and improved methods for manufacturing flatback airfoils for rotor blades that addresses the aforementioned issues.

BRIEF DESCRIPTION

Aspects and advantages of the invention will be set forth in part in the following description, or may be obvious from the description, or may be learned through practice of the invention In one aspect, the present disclosure is directed to a method for manufacturing a wind turbine rotor blade having a flatback airfoil configuration along at least a portion of a span of the rotor blade. The method includes providing a shell mold of the rotor blade. The method also includes laying up an outer skin layer of the rotor blade into the shell mold. Further, the method includes placing at least one pre-fabricated corner of the flatback airfoil configuration into the shell mold. The pre-fabricated corner(s) has a pointed edge. The method also includes infusing the outer skin layer with the pre-fabricated corner(s) to form the flatback airfoil configuration.

In one embodiment, the method may include forming the pre-fabricated corner(s) via additive manufacturing. In addition, the pre-fabricated corner(s) may be constructed of a thermoplastic material optionally reinforced with one or more fiber materials. In such embodiments, the pre-fabricated corner(s) may correspond to a downwind corner of the flatback airfoil configuration or an upwind corner of the flatback airfoil configuration.

In another embodiment, the method may include placing the pre-fabricated corner(s) of the flatback airfoil configuration into the shell mold exterior to the outer skin layer. In such embodiments, the pre-fabricated corner(s) form part of the exterior surface of the rotor blade.

Alternatively, the method may include placing one or more additional skin layers exterior to the pre-fabricated corner(s). In such embodiments, the method may also include providing a break in the one or more additional skin layers that aligns with the pointed edge of the pre-fabricated corner(s) to maintain pointedness of the corner edge. In additional embodiments, the pre-fabricated corner(s) may include an exterior surface having a predetermined roughness (e.g. a sticky surface) to help the one or more additional layers adhere thereto. The additional skin layer(s) described herein may also be formed of a thermoplastic material optionally reinforced with one or more fiber materials. The fiber material(s) described herein may include an suitable fiber types, such as glass fibers, carbon fibers, polymer fibers, wood fibers, bamboo fibers, ceramic fibers, nanofibers, metal fibers, or similar or combinations thereof.

In further embodiments, the method may include forming the pre-fabricated corner(s) via an ultra-sound signal transmitting material such that the flatback airfoil configuration can be inspected via non-destructive testing (NDT) inspection.

In additional embodiments, the shell mold may include first and second shell mold halves. In such embodiments, the step of laying up the outer skin layer of the rotor blade into the shell mold may include laying up a first side of the outer skin layer in the first shell mold half and laying up a second side of the outer skin layer in the second shell mold half. Thus, the method may also include placing the pre-fabricated corner(s) into one of the first side or the second side of the outer skin layer and joining the first and second sides of the outer skin layer together at first and second joints.

In another aspect, the present disclosure is directed to a rotor blade. The rotor blade includes exterior surfaces having a pressure side, a suction side, a leading edge and a trailing edge each extending in a generally span-wise direction between an inboard region and an outboard region.

Further, the trailing edge has a flatback airfoil configuration in the inboard region. The flatback airfoil configuration includes at least one pre-fabricated corner co-infused with the exterior surfaces. Further, the pre-fabricated corner(s) are formed via additive manufacturing using a thermoplastic material. Thus, the pre-fabricated corner(s) has a pointed edge that forms one of the corners of the flatback airfoil configuration. It should be appreciated that the rotor blade may further include any of the additional features as described herein.

In yet another aspect, the present disclosure is directed to a method for manufacturing a flatback airfoil. The method includes providing a shell mold of the airfoil. The method also includes laying up an outer skin layer of the airfoil into the shell mold. Further, the method includes forming at least one corner of the flatback airfoil via additive manufacturing. As such, the corner defines a pointed edge of the airfoil. The method also includes placing the corner(s) into the shell mold. Moreover, the method includes securing the at least one corner exterior to the outer skin layer to form the flatback airfoil. In such embodiments, the step of securing the at least one corner exterior to the outer skin layer to form the flatback airfoil further comprises at least one of bonding or melting the at least one corner to an exterior surface of the outer skin layer. It should be appreciated that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to the present disclosure;

FIG. 2 illustrates a perspective view of one embodiment of a rotor blade according to the present disclosure, particularly illustrating a portion of the rotor blade having a flatback airfoil configuration;

FIG. 3 illustrates a cross-sectional view of the rotor blade of FIG. 2 along line 3-3;

FIG. 4 illustrates a detailed schematic view of one embodiment of a downwind corner of a flatback airfoil configuration of a rotor blade according to the present disclosure;

FIG. 5 illustrates a detailed schematic view of another embodiment of a downwind corner of a flatback airfoil configuration of a rotor blade according to the present disclosure;

FIG. 6 illustrates a detailed schematic view of still another embodiment of a downwind corner of a flatback airfoil configuration of a rotor blade according to the present disclosure; and FIG. 7 illustrates a detailed schematic view of yet another embodiment of a downwind corner of a flatback airfoil configuration of a rotor blade according to the present disclosure; and FIG. 8 illustrates a flow diagram of one embodiment of a method for manufacturing a flatback airfoil portion of a rotor blade according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing flatback airfoils for wind turbine rotor blades. Thus, airfoils manufactured according to the present disclosure include pointed downwind or upwind corners to maximize aerodynamic efficiency. In addition, airfoils of the present disclosure include an integrated additive inlay that can be co-infused into the downwind shell of the rotor blade. An additional means of reinforcing the downwind corner by using e.g. thermoplastic additive parts and/or using a single continuous sandwich core running from an existing trailing edge shell panel and up to the trailing edge glue joint located at an upwind edge may be utilized. The flatback airfoil may also include reinforcing structures for the sandwich panel corner, which can be on either shell (upwind or downwind) depending on the location of the trailing edge adhesive joint.

The present disclosure provides many advantages not present in the prior art. For example, airfoils of the present disclosure facilitate easier inspection of the trailing edge bond line. In addition, the invention also facilitates easier design of the core panels around the downwind corner and removes defects associated with conventional manufacturing methods. Further, the additive corner not limited to being embedded/enclosed by reinforcement material, but can also be configured as the outer-most or inner-most layer.

Referring now to the drawings, FIG. 1 illustrates a perspective view of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring to FIG. 2, a perspective view of one of the rotor blades 16 of FIG. 1 is illustrated, at least a portion of which has a flatback airfoil configuration 20 as shown in FIG. 3. As shown particularly in FIG. 2, the rotor blade 16 has exterior surfaces defining a pressure side 22, a suction side 24, a leading edge 26, and a trailing edge 28. More specifically, as shown, the pressure and suction sides 22, 24 may each extend between the leading edge 26 and the trailing edge 28. Further, the exterior surfaces extend between an inboard region 30 and an outboard region 32 in a generally span-wise direction. The inboard region 30 includes the blade root 34 and the outboard region 32 includes the blade tip 36. The pressure and suction sides 22, 24, as well as the leading and trailing edges 26, 28, are generally aerodynamic surfaces having aerodynamic contours, as is generally known in the art.

The rotor blade 16 may further define a chord 38 and a span 40 extending in chord-wise and span-wise directions, respectively. Further, as shown, the chord 38 may vary throughout the span 40 of the rotor blade 16. Thus, as discussed below, a local chord 42 may be defined for the rotor blade 16 at any point on the rotor blade 16 along the span 40. Further, the rotor blade 16 may define a maximum chord 44, as shown.

One or more structural components may also be included within the rotor blade 16 to provide structural support to the rotor blade 16. For example, FIG. 3 illustrates a shear web 46 extending between two spar caps 48, 50. The shear web 46 and spar caps 48, 50 may extend through the rotor blade 16 or any portion thereof in the generally span-wise direction. Thus, as shown, the external surfaces defining the pressure side 22 and suction side 24 may include, or may cover, the spar caps 48, 50.

Referring still to FIG. 3, at least a portion of the cross-section of the airfoil has a flatback configuration 20. For example, as shown, the airfoil has a flatback configuration 20 in the inboard region 30 of the rotor blade 16 to allow for higher lift of thick airfoils at reduced chords. Thus, as shown, the flatback airfoil 20 includes the leading edge 26 and a flat trailing edge 28. In addition, as shown, the flatback airfoil 20 includes a downwind corner 52 and an upwind corner 54.

Referring now to FIGS. 4-7, partial views of various embodiments of the flatback airfoil 20 are illustrated, particularly illustrating the downwind corner 52 of the flatback airfoil 20. It should also be understood that the pre-fabricated corner 56 may also correspond to the upwind corner 54 of the flatback airfoil configuration. In addition, as shown, the downwind corner 52 includes a pre-fabricated corner 56 co-infused with the exterior surfaces of the rotor blade 16. Thus, as shown, the pre-fabricated corner(s) 56 defines a pointed edge 58 that forms one of the corners (such as the downwind corner 52) of the flatback airfoil configuration. In such embodiments, as shown in FIG. 3, the upwind corner 54 may be defined by one of the joints 60, 62 between the exterior surfaces of the rotor blade 16. More specifically, the pre-fabricated corner(s) 56 are formed via technologies such as 3-D Printing, additive manufacturing, automated fiber deposition, as well as other techniques that utilize CNC control and multiple degrees of freedom to deposit material.

The pre-fabricated corner(s) 56 may form part of the exterior surface of the airfoil or may be interior of the exterior surface. For example, as shown in FIGS. 4 and 5, one or more additional skin layers 64 may be positioned exterior to the pre-fabricated corner(s) 56. In such embodiments, the one or more additional skin layers 64 may be interrupted to include a break 66 therein that aligns with the pointed edge 58 of the pre-fabricated corner(s) 56. Thus, the break 66 helps to maintain pointedness of the corner edge 58. The additional skin layer(s) 64 may be constructed of any suitable materials, such as any thermoplastic or thermoset materials optionally reinforced with one or more fiber materials. In such embodiments, the fiber material(s) may include any suitable fiber types, such as glass fibers, carbon fibers, polymer fibers, wood fibers, bamboo fibers, ceramic fibers, nanofibers, metal fibers, or similar or combinations thereof. Referring particularly to FIG. 4, the pre-fabricated corner(s) 56 may be embedded between various skin layers of the blade shell. In such embodiments, the pre-fabricated corner(s) 56 may be placed atop a corner 68 of the airfoil having a predetermined radius or curvature. Such curvature is formed during the manufacturing process, but is not pointed enough Alternatively, as shown in FIG. 5, the pre-fabricated corner(s) 56 may define part of the inner-most surface of the airfoil.

In still further embodiments, as shown particularly in FIG. 6, the pre-fabricated corner(s) 56 of the flatback airfoil configuration may be exterior to the outer skin layers or exterior surfaces 22, 24 of the rotor blade 16. In such embodiments, as shown, the pre-fabricated corner(s) 56 forms part of the exterior surface of the rotor blade 16. In addition, in such embodiments, the pre-fabricated corner(s) 56 may be co-infused with the outer skin layers or exterior surfaces 22, 24 of the rotor blade 16 or may be bonded or melted thereto. Further, as shown, the pre-fabricated corner(s) 56 of the flatback airfoil configuration may be coated with a coating material 70, such as gel coats, protective tapes (e.g. PPT), thermoplastic films, and any other suitable coating materials that provide protection against environmental elements and/or ultraviolet rays.

In yet another embodiment, as shown in FIG. 7, the pre-fabricated corner(s) 56 of the flatback airfoil configuration may be partially embedded within the outer skin layers of the rotor blade 16 with the pointed corner 58 extending out of the layers. More specifically, as shown, the pre-fabricated corner(s) 56 may include one or more indentions 68 that allow the fibers of the outer skin layer to end before the pointed edge 58.

In addition, in certain embodiments, the pre-fabricated corner(s) 56 may be constructed using a thermoplastic material optionally reinforced with one or more fiber materials. The thermoplastic materials used to form the pre-fabricated corner(s) described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. In addition, the pre-fabricated corner(s) 56 may be solid or hollow.

Referring to FIG. 8, a flow diagram of one embodiment of a method 100 for manufacturing a rotor blade having a flatback airfoil configuration along at least a portion of the span of the rotor blade is illustrated. For example, the rotor blade 16 described herein may be manufactured according to the methods described herein. As shown at 102, the method 100 includes providing a shell mold of the rotor blade 16. In certain embodiments, the shell mold may include first and second mold halves. Thus, as shown at 104, the method 100 includes laying up a first side of an outer skin layer (e.g. one of the exterior surfaces 22, 24) of the rotor blade into the first mold half. As shown at 106, the method 100 may include forming the pre-fabricated corner(s) 56 via technologies such as 3-D Printing, additive manufacturing, automated fiber deposition, as well as other techniques that utilize CNC control and multiple degrees of freedom to deposit material. As shown at 108, the method 100 includes placing the pre-fabricated corner(s) 56 into the first shell mold. For example, in one embodiment, the method 100 may include placing the pre-fabricated corner(s) 56 of into the shell mold such that the corner 56 is exterior to the outer skin layer 22, 24 (FIG. 6). In such embodiments, as mentioned, the pre-fabricated corner(s) 56 form part of the exterior surface of the rotor blade 16.

Alternatively, the method 100 may include placing one or more additional skin layers 64 exterior to the pre-fabricated corner(s) 56, e.g. as shown in FIGS. 4 and 5. In such embodiments, as shown, the method 100 may also include providing a break 66 in the additional skin layers 64 that aligns with the pointed edge 58 of the pre-fabricated corner (s) 56 to maintain pointedness of the corner edge 58. More specifically, as mentioned, the additional skin layer(s) 64 may also be formed of a thermoplastic material optionally reinforced with one or more fiber materials as described herein.

Referring still to FIG. 7, as shown at 110, the method 100 includes infusing the first side of the outer skin layer(s) with the pre-fabricated corner 56. As shown at 112, the method 100 further includes forming a second side of the outer skin layer in the second mold half. Accordingly, as shown at 114, the method 100 includes joining the first and second sides 22, 24 of the outer skin layer together at first and second joints 60, 62, as shown in FIG. 3. As such, when the first and second sides 22, 24 of the outer skin layer are arranged together, the pre-fabricated corner 56 forms the downwind corner 52 of the flatback airfoil 20 and the second joint 62 forms the upwind corner 54 of the flatback airfoil 20. Therefore, as shown in FIGS. 4 and 5, the corners 52, 54 provide two pointed edges of the flatback airfoil 20.

In further embodiments, the method 100 may include forming the pre-fabricated corner(s) via an ultra-sound signal transmitting material such that the flatback airfoil configuration can be inspected via non-destructive testing (NDT) inspection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a wind turbine rotor blade having a flatback airfoil configuration along at least a portion of a span of the rotor blade, the method comprising:
   providing a shell mold of the rotor blade;
   laying up an outer skin layer of the rotor blade into the shell mold;
   placing at least one pre-fabricated corner of the flatback airfoil configuration into the shell mold, the at least one pre-fabricated corner having a pointed edge; and,
   infusing the outer skin layer with the at least one pre-fabricated corner to form the flatback airfoil configuration.

2. The method of claim 1, further comprising forming the at least one pre-fabricated corner via additive manufacturing.

3. The method of claim 2, wherein the at least one pre-fabricated corner is constructed of a thermoplastic material.

4. The method of claim 1, wherein the at least one pre-fabricated corner comprises at least one of a downwind corner of the flatback airfoil configuration or an upwind corner of the flatback airfoil configuration.

5. The method of claim 1, further comprising placing the at least one pre-fabricated corner of the flatback airfoil configuration into the shell mold exterior to the outer skin layer.

6. The method of claim 5, further comprising coating the at least one pre-fabricated corner of the flatback airfoil configuration with a coating material.

7. The method of claim 1, further comprising placing one or more additional skin layers exterior to the at least one pre-fabricated corner.

8. The method of claim 7, further comprising providing a break in the one or more additional skin layers that aligns with the pointed edge of the at least one pre-fabricated corner to maintain pointedness of the pointed edge.

9. The method of claim 7, wherein the at least one pre-fabricated corner comprises an exterior surface having a predetermined roughness to help the one or more additional layers adhere thereto.

10. The method of claim 7, wherein the one or more additional skin layers comprises a thermoplastic material reinforced with one or more fiber materials, wherein the one or more fiber materials comprise at least one of glass fibers, carbon fibers, polymer fibers, wood fibers, bamboo fibers, ceramic fibers, nanofibers, metal fibers, or combinations thereof.

11. The method of claim 1, further comprising forming the at least one pre-fabricated corner via an ultra-sound signal transmitting material such that the flatback airfoil configuration can be inspected via non-destructive testing (NDT) inspection.

12. The method of claim 1, wherein the shell mold comprises first and second shell mold halves, the step of laying up the outer skin layer of the rotor blade into the shell mold further comprises:
   laying up a first side of the outer skin layer in the first shell mold half; and,
   laying up a second side of the outer skin layer in the second shell mold half.

13. The method of claim 12, further comprising:
   placing the at least one pre-fabricated corner into one of the first side or the second side of the outer skin layer; and,
   joining the first and second sides of the outer skin layer together at first and second joints.

14. A rotor blade, comprising:
   exterior surfaces comprising a pressure side, a suction side, a leading edge and a trailing edge each extending in a generally span-wise direction between an inboard region and an outboard region, wherein the trailing edge comprises a flatback airfoil configuration in the inboard region, the flatback airfoil configuration comprising at least one pre-fabricated corner co-infused with the exterior surfaces, the at least one pre-fabricated corner formed using a thermoplastic material, the at least one pre-fabricated corner having a pointed edge.

15. The rotor blade of claim 14, wherein the at least one pre-fabricated corner comprises at least one of a downwind corner of the flatback airfoil configuration or an upwind corner of the flatback airfoil configuration.

16. The rotor blade of claim 14, wherein the at least one pre-fabricated corner of the flatback airfoil configuration is exterior to the exterior surfaces of the rotor blade.

17. The rotor blade of claim 14, further comprising one or more additional skin layers exterior to the at least one pre-fabricated corner.

18. The rotor blade of claim 17, further comprising a break in the one or more additional skin layers that aligns with the pointed edge of the at least one pre-fabricated corner to maintain pointedness of the pointed edge, wherein the one or more additional skin layers comprises a thermoplastic material reinforced with one or more fiber materials.

19. A method for manufacturing a flatback airfoil, the method comprising:
providing a shell mold of the airfoil;
laying up an outer skin layer of the airfoil into the shell mold;
forming at least one corner of the flatback airfoil via additive manufacturing, the at least one corner defining a pointed edge of the airfoil; and,
securing the at least one corner exterior to the outer skin layer to form the flatback airfoil.

20. The method of claim 19, wherein securing the at least one corner exterior to the outer skin layer to form the flatback airfoil further comprises at least one of bonding or melting the at least one corner to an exterior surface of the outer skin layer.

* * * * *